(12) United States Patent
Tao et al.

(10) Patent No.: US 7,463,691 B2
(45) Date of Patent: Dec. 9, 2008

(54) FEEDBACK-TYPE CHANNEL ESTIMATION METHOD AND A DEVICE BASED ON A PN SEQUENCE AND A PILOT FREQUENCY IN AN OFDM SYSTEM

(75) Inventors: Linan Tao, Shanghai (CN); Dong Li, Shanghai (CN); Liyu Cai, Shanghai (CN)

(73) Assignee: Alcatel, Paris (FR)

( * ) Notice: Subject to any disclaimer, the term of this patent is extended or adjusted under 35 U.S.C. 154(b) by 875 days.

(21) Appl. No.: 10/917,284

(22) Filed: Aug. 13, 2004

(65) Prior Publication Data

US 2005/0052989 A1    Mar. 10, 2005

(30) Foreign Application Priority Data

Aug. 15, 2003  (CN)  .............................. 03 1 42280

(51) Int. Cl.
*H04L 27/28*   (2006.01)
*H03D 1/00*    (2006.01)

(52) U.S. Cl. ....................................... 375/260; 375/340

(58) Field of Classification Search .................. 375/130, 375/147–149, 260, 340
See application file for complete search history.

(56) References Cited

U.S. PATENT DOCUMENTS

| 6,134,280 A * | 10/2000 | Matui ........................ 375/341 |
| 2003/0043887 A1 * | 3/2003 | Hudson ...................... 375/144 |
| 2004/0174940 A1 * | 9/2004 | Kim et al. .................. 375/340 |

* cited by examiner

*Primary Examiner*—Don N Vo
(74) *Attorney, Agent, or Firm*—Sughrue Mion, PLLC

(57) ABSTRACT

The invention provides a feedback-type channel estimation method and device based on a PN sequence and a pilot frequency in an OFDM system, said method obtains an impulse channel estimation of this OFDM symbol by obtaining a channel impulse response of a pseudo-random (PN) sequence of a received signal; then by obtaining a channel estimation of the pilot frequency symbol; and then by combining the former two results with a channel estimation of a previous OFDM symbol. The new channel estimation method of this invention can complete the interpolation function It has the advantages of high performances and low complexity, and is particular useful for OFDM system in high speed and long delay multipath environment.

18 Claims, 4 Drawing Sheets

FEEDBACK-TYPE CHANNEL ESTIMATION METHOD AND A DEVICE BASED ON A PN SEQUENCE AND A PILOT FREQUENCY IN AN OFDM SYSTEM

CROSS-REFERENCE TO RELATED APPLICATION(S)

This application is based on the Chinese Patent Application No. 03142280.2 filed on Aug. 15, 2003, the disclosure of which is hereby incorporated by reference thereto in its entirety, and the priority of which is hereby claimed under 35 U.S.C. §119.

FIELD OF THE INVENTION

This invention relates to the OFDM mobile communication field, and more particularly, to a feedback-type channel estimation method and device based on a PN sequence and a pilot frequency in an OFDM system, such as the super 3G system.

BACKGROUND OF THE INVENTION

The OFDM modulation technology, with characteristics of high frequency spectrum utilization rate and anti multi-path, has been regarded as a critical technology in the future mobile communication system. The multi-stage modulation scheme using non-continuous amplitudes makes the OFDM system to have a high speed and a high frequency spectrum utilization rate, and at the same time, it also makes the OFDM system to require estimating and tracking the attenuating channel parameters to complete related demodulation.

The channel estimation is used to perform an interpolation function. At present, there are many interpolation methods of channel transformation, such as linear interpolation, second order interpolation, transformation domain interpolation, time domain interpolation, and the like; for details, see "Channel Estimation of OFDM System Based on Comb-like Pilot Frequency Arrangement in Frequency Selective Attenuating Channel" [2] by M. Hsieh and C. Wei on User Electronics, Electric and Electronic Engineer Association Conference, vol. 44, First, February 1998, and "Channel Cstimation Technology Based on Pilot Frequency Arrangement in OFDM System" by Sinem Coleri and Mustafa Ergen on Broadcast, p. 223-229, vol. 48, Third, September 2002. The transformation domain interpolation method and the time domain interpolation technology are briefly introduced hereinafter.

The transformation domain interpolation method comprises the following steps: (1) transforming a channel estimation to a transformation domain, based on pilot frequency symbols calculate a pilot frequency channel estimation by use of a method, such as least square method or linear minimum mean square error method, and then perform a digital Fourier transformation (DFT) operation; and then transform the transformed data sequence into frequency domain by inserting zeros and then perform IDFT (inverse digital Fourier transformation) to complete interpolation operation at the same time.

The channel estimation method [2] [3] using the time domain interpolation technology is a traditional channel estimation method based on the DFT interpolation: after a channel estimation of a pilot frequency sub-carrier is obtained by the LS method or the LMMSE method, transform the channel estimation into time domain to obtain a channel impulse response (CIR) by the IDFT operation, add zeros to the tail part of CIR, and then transform it back into frequency domain by the DFT operation.

The methods for transforming domains are not suitable for long delay multi-path channels, such as UMTS on board type B or COST207 channel, as shown in FIGS. 1(a)-FIGS. 1(c). Because zeros are added in the middle of the DFT transformed sequence, the useful portion of the DFT is divided into two parts, and at the same time, the association between them is broken thus causing estimation error. FIGS. 1(a)-FIGS. 1(c) show the simulation in the case of COST207.

Although the method of performing the IDFT and then adding zeros by using the time domain interpolation technology will not produce errors in the similar transformation process, such method fails to effectively eliminate noise and interference. As shown in FIGS. 2(a)-FIGS. 2(c), the performance of the channel estimation has not been improved.

SUMMARY OF THE INVENTION

In order to overcome the defects in the prior art, this invention provides a new channel estimation method for completing interpolation function, which is based on a PN sequence and a pilot frequency symbol and uses feedback to enhance channel estimation. This invention is particularly useful for the OFDM system in high speed and long-delay multi-path environment.

The technical solution is realized by providing a feedback-type enhancing channel estimation method based on a PN sequence and a pilot frequency in a mobile OFDM communication system, the method includes the following steps:

a. obtain a channel impulse response of a pseudo-random (PN) sequence of a received signal;

b. obtain a channel estimation of the pilot frequency symbol; and c. combine the results of Step a and Step b with a channel estimation of a previous OFDM symbol to obtain an impulse channel estimation of this OFDM symbol.

Wherein before Step a, a step of extracting the PN sequence of the received signal after it is synchronized is included. The channel impulse response of the PN sequence can be obtained by the following equation:

$$CIR_{PN} = IDFT\left(\frac{DFT(\text{recieved PN sequence})}{DFT(\text{sent PN sequence})}\right) \quad (1)$$

Wherein Step b, the channel estimation for the pilot frequency symbol is obtained using a least square (LS) method or a minimum mean square error (MMSE) method.

Step c comprises the following steps:

c1. Perform IDFT for the channel estimation of the pilot frequency symbol in Step b to obtain a channel impulse response CIRpilot of the pilot frequency symbol in the time domain;

c2. Weight—the channel estimation of a previous OFDM symbol and then perform IDFT to obtain a channel impulse response CIRprevioussymbol of the previous OFDM symbol in the time domain; and c3. Combine the channel impulse response CIRPN of the PN sequence, the channel impulse response CIRpilot of the pilot frequency symbol, and the channel impulse response CIRpreviousOFDMsymbol of the previous OFDM symbol with a combination function to obtain a channel impulse response of this OFDM symbol:

$$CIR\text{this}OFDM\text{symbol}=f(CIRPN, CIR\text{Pilot}, CIR\text{previousOFDMsymbol}) \quad (2)$$

Where the function has defined in the above equation is a combination function for performing the maximum ratio combination or equal gain combination algorithms for the MST (Most Significant Tap). There is no need to determine every tap of the channel impulse responses, because the effective power of many taps are very low and most components are noises and interferences; it is sufficient to determine only M most significant taps (MST).

Weighting channel estimation of a previous OFDM symbol in Step c2 is to delay the channel estimation of the OFDM symbol at a previous time an OFDM symbol period and to weight the delayed channel estimation result. If the weighting factor is set within (0, 1], the previous useful CIR information is fed back, and if the weighting factor is set to 0, the weighted information is reset in an interval of time—so as to keep the system stable.

A step is further included, to perform the DFT operation for the whole OFDM symbols after adding zeros to the CIRthisOFDMsymbol to obtain the channel estimation of the whole OFDM symbols and send it to an equalizer to obtain a user symbol.

The feedback-type enhancing channel estimation method based on the PN sequence and the pilot frequency symbol of this invention—can complete interpolation function—It has the advantages of high performances and low complexity, and is particular useful for the OFDM system in high speed and long-delay multi-path environment.

BRIEF DESCRIPTION ON THE DRAWINGS

The accompanying drawings, which are incorporated in and constitute a part of the specification, illustrate embodiments of the invention and, together with the description, serve to explain the principles of the invention.

FIGS. 1(a)-FIGS. 1(c) are simulation illustrations of the transformation domain interpolation method in COST207 environment;

FIGS. 2(a)-FIGS. 2(c) are simulation illustrations of the existing time domain interpolation technology;

DESCRIPTION OF THE PREFERRED EMBODIMENTS

The preferred embodiments of the present invention will be described in detail in accordance with the accompanying drawings.

This invention is hereinafter described in detail in combination with preferred embodiments.

Figure 1A:
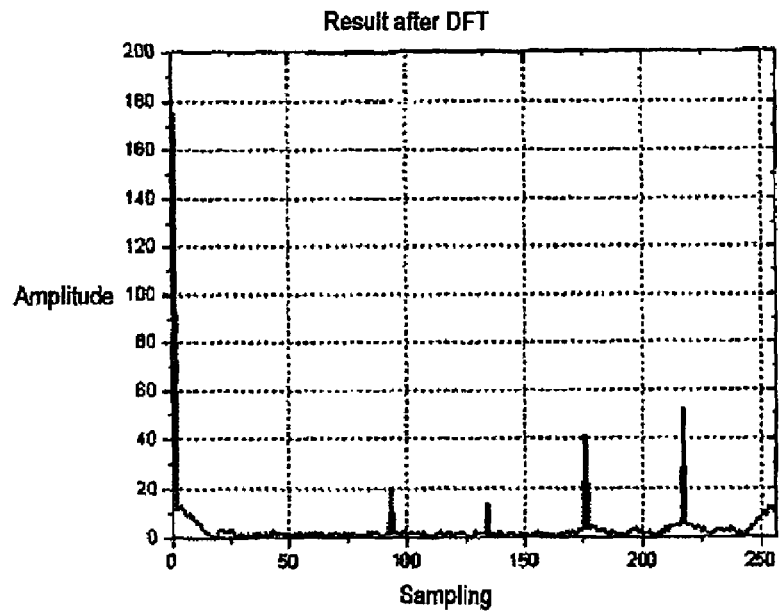
Figure 1B:
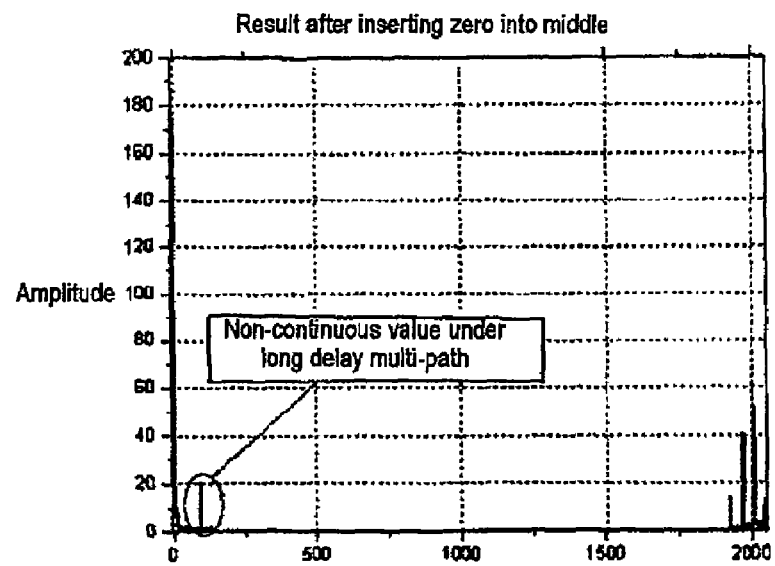
Figure 1C:
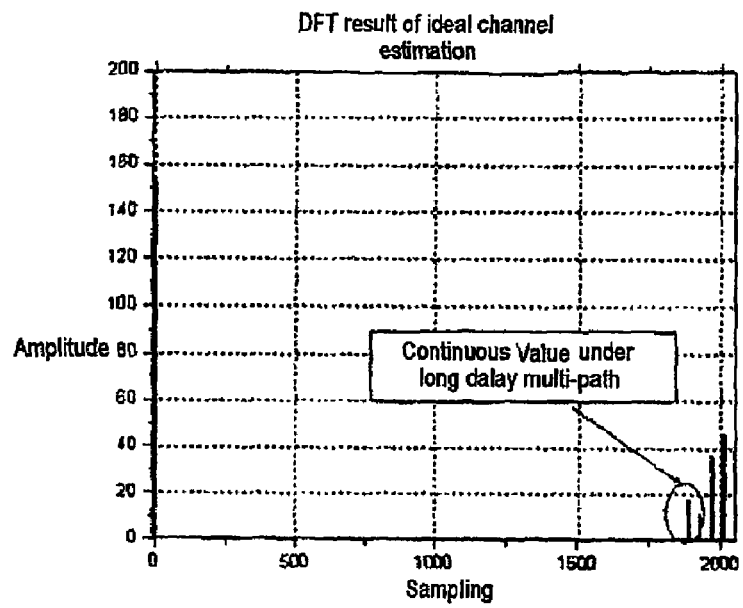
Figure 2A:
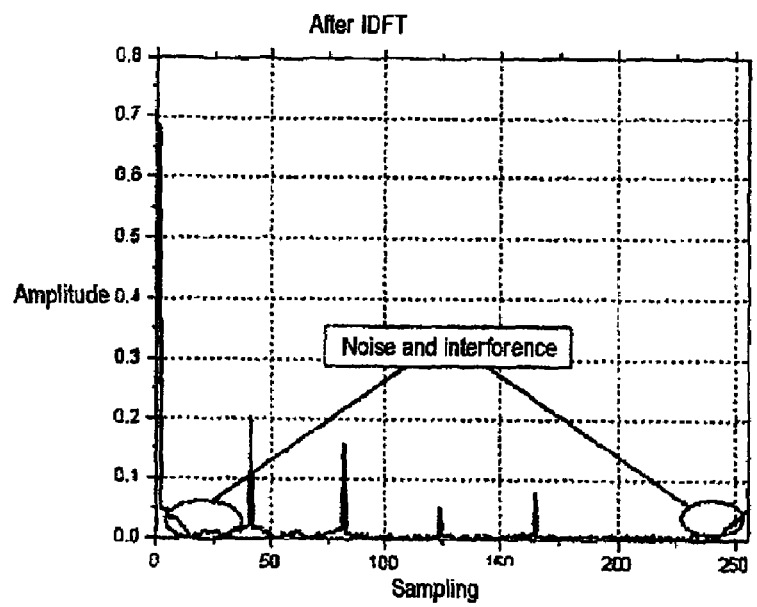
Figure 2B:
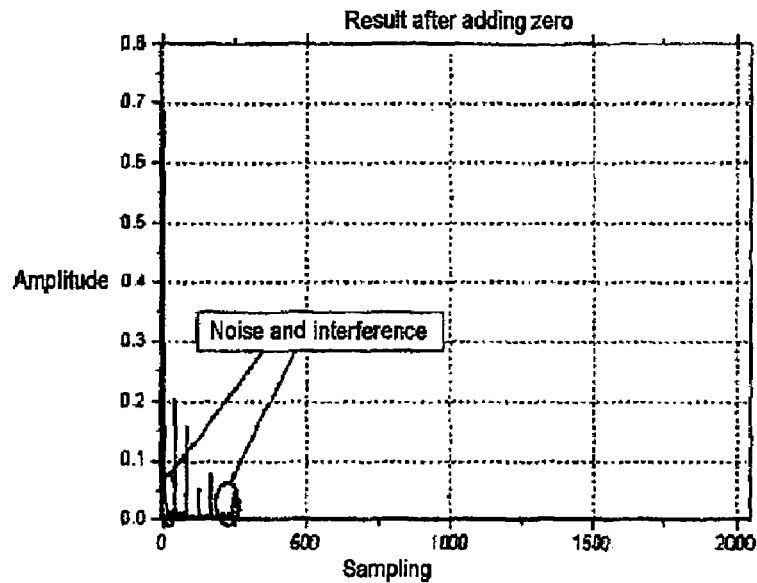
Figure 2C:
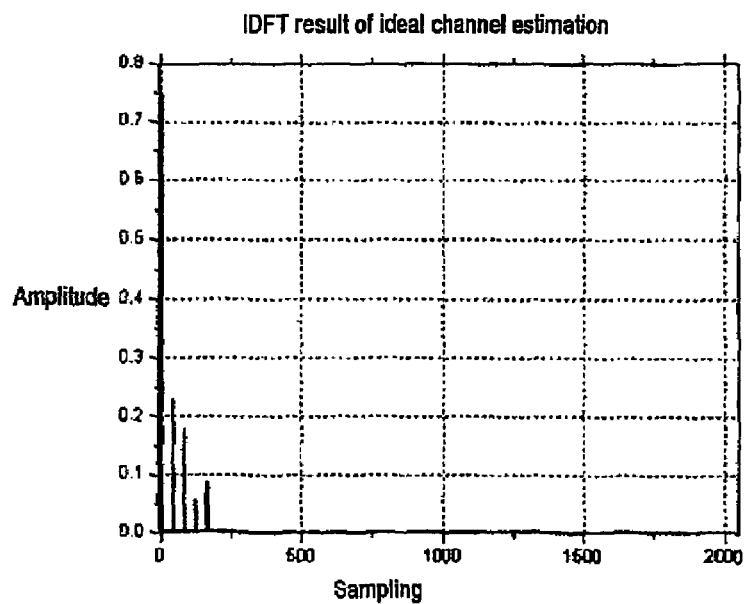
Figure 3:
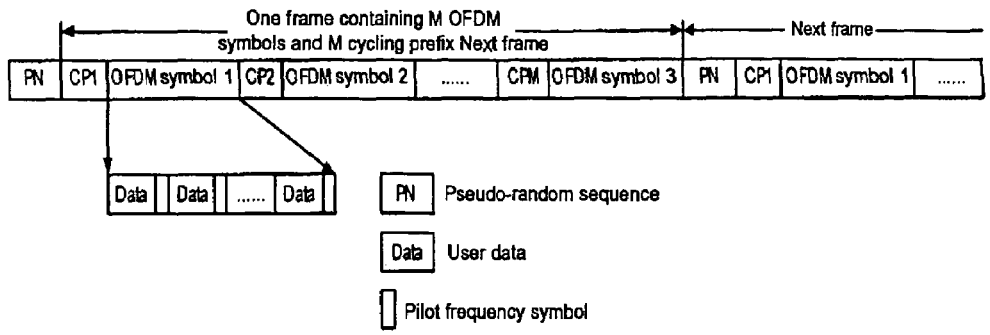
FIG. 3 is a frame structure of a received signal.

A frame structure of a received signal is shown in FIG. 3, where one frame includes a PN sequence, a cycling prefix 1, an OFDM symbol 1, a cycling prefix 2, an OFDM symbol ..., wherein the OFDM symbol is user data and pilot frequency signal.

Figure 4:
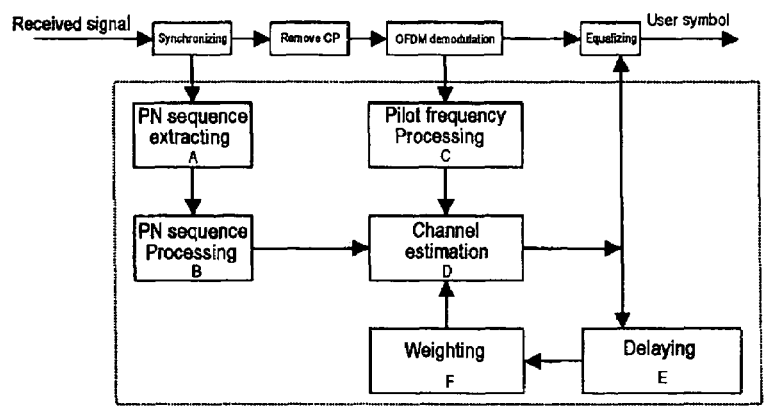
FIG. 4 is a channel estimation flow diagram according to this invention.

As shown in FIG. 4, a received first frame is described as an example.

(1) The PN sequence is extracted from the received signal after it is synchronized (Step A), and the PN sequence is processed as follows (Step B):

First perform the DFT operation for the received PN sequence to obtain a sequence DFTPNRece_m, where $0 \leq m \leq M-1$;

If the PN sequence of the received signal is imaged as $[PN_{Rece\_0}, PN_{Rece\_1}, \ldots, PN_{Rece\_M-1}]$, the result of its DFT operation is as follows:

$$DFTPN_{\text{Rece}\_m} = \sum_{n=0}^{M-1} PN_{\text{Rece}\_n} \cdot e^{-j\frac{2\pi nm}{M}}, 0 \leq m \leq M-1$$

Next perform the DFT operation for the PN sequence of a sent signal to obtain a sequence DFTPNSend_m, where $0 \leq m \leq M-1$;

If the sent PN sequence is imaged as $[PN_{Send\_0}, PN_{Send\_1}, \ldots, PN_{Send\_M-1}]$, the result of its DFT operation is as follows:

$$DFTPN_{\text{Send}\_m} = \sum_{n=0}^{M-1} PN_{\text{Send}\_n} \cdot e^{-j\frac{2\pi nm}{M}}, 0 \leq m \leq M-1$$

Divide the former result by the later result to obtain a temporary result sequence Tempm, where $0 \leq m \leq M-1$;

$$Temp_m = DFTPN_{Rece\_m}/DFTPN_{Send\_m}, 0 \leq m \leq M-1$$

Perform the IDFT operation for the temporary result sequence Tempm to obtain a channel impulse response CIRPN=[CIRPN_0, CIRPN_1, ..., CIRPN_M−1] of the PN sequence, where $$CIR_{\text{PN}\_n} = \frac{1}{M} \sum_{m=0}^{M-1} Temp_m \cdot e^{j\frac{2\pi nm}{M}}, 0 \leq n \leq M-1$$

(2) Then perform pilot frequency processing to obtain a channel estimation of a pilot frequency signal (Step C): perform the LS or the LMMSE estimation for the pilot frequency, i.e. □in FIG. 3, in the OFDM symbol, to obtain a pilot frequency estimation sequence CEp, where $0 \leq p \leq P-1$, P being the number of pilot frequencies in OFDM symbols;

(3) Follow by combining the results of Step(1) and Step(2) as well as those of a channel estimation of a previous OFDM symbol, to obtain a channel impulse response of this OFDM symbol (Step D):

3a: Perform the IDFT operation for the pilot frequency estimation sequence CEp ($0 \leq p \leq P-1$) to obtain a channel impulse response CIRPilots of the pilot frequency signal, i.e.

$$CIR_{\text{Pilots}\_n} = \frac{1}{P} \sum_{p=0}^{P-1} CE_p \cdot e^{j\frac{2\pi np}{P}}, 0 \leq n \leq P-1$$

3b: After weighting the channel estimation result of the previous OFDM symbol, performing the IDFT operation to obtain a channel impulse response CIRPreviousSymbol of a previous OFDM symbol, i.e.

$$CIR_{PreviousSymbol\_n} = \frac{1}{N}\sum_{p=0}^{N-1} w_p CE_{PreviousSymbol\_p} \cdot e^{j\frac{2\pi np}{N}},$$

$$0 \leq n \leq N-1,$$

where wp is a weighting factor;

3c: Combine and process the three sequences obtained and described above, i.e. the channel impulse response CIRPN of the PN sequence, the channel impulse response CIRPilots of the pilot symbol, and the channel impulse response CIRPreviousSymbol of the previous OFDM symbol, to obtain a sequence CIRThisOFDMSymbol. Two parameters are determined by the combining operation: a CIR position (n) and a magnitude (i.e.CIRThisOFDMSymbol_n) of CIR. At the same time, there is no need to determine every tap of the channel impulse responses, because the effective power of many taps are very low and most components are noises and interferences; it is sufficient to determine only M most significant taps (MST). If the channel is a rapidly attenuating channel and CIR changes rapidly, positions of only three CIR (i.e. n) can be combined and processed, and equal gain combination or maximum ratio combination can be performed according to the three parameters, so as to determine which ns should be preserved and which ns should be reset. The magnitudes of the CIRs on the preserved ns are equal to the magnitude of CIRPilots on the corresponding ns, i.e., if the ns are determined to be preserved when n=0, then CIRThisOFDMSymbol—0=CIRPilots__0.

If the channel is a slowly attenuating channel and CIR changes slowly, both the positions of CIRs and magnitudes of the CIRs are combined at the same time, and the combination method can be either equal combination or maximum ratio combination;

3d: Expand CIRThisOFDMSymbol into N points sequence (N is the length of the OFDM symbol), where ns preserved in Step 3c are kept unchanged and other ns's are all reset;

3e: Perform N points DFT for the expanded N points sequence CIRThisOFDMSymbol to obtain a channel estimation result corresponding to this OFDM symbol, i.e.

$$CE_{ThisOFDMSymbol\_m} = \frac{1}{N}\sum_{n=0}^{N-1} CIR_{ThisOFDMSymbol\_n} \cdot e^{j\frac{2\pi nm}{N}},$$

$$0 \leq m \leq N-1$$

(4) Divide CEThisOFDMSymbol into two signals, one of which is sent to an equalizer, which equalizes this OFDM symbol to obtain user symbol;

(5) Delay the other CEThisOFDMSymbol signal one OFDM symbol (Step E) and then send to a weighting unit; the weighting unit weights and processes the signal (Step F) In order to prevent mis-locking and dead-locking, all results are reset before the beginning each frame, i.e. setting weighting value wp=0. In other cases, the weighting value is set to 1.

Operate the second OFDM symbol and skip to Step (2) to continue the processing.

By comparing the technical solution of this invention to the existing channel estimation method, the following results are obtained:

In rapidly moving surroundings, the quality of the channel estimation, obtained by the channel estimation method of the invention, is significantly improved and is applicable to low signal-noise ratio surroundings. Furthermore, except for the requirement that the CP length must be greater than the maximum delay of the multi-path channel, the invention does not have any other limitation to the frame structure. In addition, since each frame only has one PN sequence, this invention will not increase the complexity of the system.

What is claimed is:

1. A feedback-type channel estimation method based on a PN sequence and a pilot frequency in an OFDM system, the method comprising:
    (a) obtaining a channel impulse response of the pseudo-random (PN) sequence of a received signal;
    (b) obtaining a channel estimation of the pilot frequency symbol;
    (c) combining the results of Steps (a) and (b) with a channel estimation of a previous OFDM symbol to obtain an impulse channel estimation of this OFDM symbol; and
    (d) processing the received signal using the impulse channel estimation.

2. The method according to claim 1, wherein before said Step (a), further comprises a step of extracting the PN sequence of the received signal after said received signal is synchronized.

3. The method according to claim 2, wherein the channel impulse response of the PN sequence in said Step (a) can be obtained by the following equation:

$$CIR_{PN} = IDFT\left(\frac{DFT(\text{recieved } PN \text{ sequence})}{DFT(\text{sent } PN \text{ sequence})}\right). \quad (1)$$

4. The method according to claim 1, wherein in said Step (b), the channel estimation for the pilot frequency symbol is obtained by using a least square (LS) method or a minimum mean square error (MMSE) method.

5. The method according to claim 1, wherein said Step (c) comprises:
    (c1). performing IDFT for the channel estimation of the pilot frequency symbol in Step (b), to obtain a channel impulse response CIRpilot of the pilot frequency symbol on time domain;
    (c2). weighting the channel estimation of a previous OFDM symbol and then performing IDFT, to obtain a channel impulse response CIRpreviousOFDMsymbol of the previous OFDM symbol on time domain; and
    (c3). combining the channel impulse response CIRPN of the PN sequence, the channel impulse response CIRpilot of the pilot frequency symbol, and the channel impulse response CIRpreviousOFDMsymbol of the previous OFDM symbol with a combination function, to obtain a channel impulse response of this OFDM symbol:

CIRthis*OFDM*symbol=*f*(CIRPN, CIRPilot, CIRprevi-
      ous*OFDM*symbol)          (2)

Where the function f is a combination function for performing a maximum ratio combination or equal gain combination algorithms for a MST (Most Significant Tap).

6. The method according to claim 5, wherein weighting channel estimation of a previous OFDM symbol in said Step (c2) is to delay the channel estimation of the OFDM symbol at a previous time an OFDM symbol period and to weight the delayed channel estimation result.

7. The method according to claim 6, wherein if the weighting factor is set within (0, 1], the previous useful CIR information is fed back, and if the weighting factor is set to 0, the weighted information is reset in an interval of time, so as to keep the system stable.

8. The method according to claim 5, wherein it further includes a step of after adding zeros to the CIRthisOFDMsymbol, performing a DFT operation to obtain the channel estimation of the whole OFDM symbols and sending it to an equalizer to obtain a user symbol.

9. A feedback-type channel estimation device based on a PN sequence and a pilot frequency in an OFDM system, wherein said device further includes:
   a PN sequence extracting means for obtaining a pseudorandom (PN) sequence of a received signal;
   a PN sequence processing means for obtaining a channel impulse response of the PN sequence;
   a pilot frequency processing means for obtaining a channel estimation of the pilot frequency symbol; and
   means for obtaining a channel estimation of this OFDM symbol, said means combining the output of said PN sequence processing means and the output of said pilot frequency processing means with a channel estimation of a previous OFDM symbol, so as to obtain a channel estimation of this OFDM symbol.

10. The channel estimation device according to claim 9, wherein said PN sequence extracting means extracts the PN sequence of the received signal after it is synchronized.

11. The channel estimation device according to claim 9, wherein said PN sequence processing means obtains a channel impulse response of the PN sequence by the following equation:

$$CIR_{PN} = IDFT\left(\frac{DFT(\text{recieved PN sequence})}{DFT(\text{sent PN sequence})}\right). \quad (1)$$

12. The channel estimation device according to claim 9, wherein said pilot frequency processing means obtains a channel estimation for the pilot frequency symbol with a least square (LS) method or a minimum mean square error (MMSE) method.

13. The channel estimation device according to claim 9, wherein said means for obtaining a channel estimation of said OFDM symbol, performs IDFT for a channel estimation of said pilot frequency symbol, to obtain a pilot frequency channel impulse response CIRpilot in a time domain.

14. The channel estimation device according to claim 13, wherein said channel estimation device combines a channel impulse response CIRPN of the PN sequence, a channel impulse response CIRpilot of the pilot frequency symbol, and a channel impulse response CIRpreviousOFDMsymbol of the previous OFDM symbol with a combination function, to obtain a channel impulse response of this OFDM symbol:

$$CIRthisOFDMsymbol = f(CIRPN, CIRPilot, CIRpreviousOFDMsymbol) \quad (2)$$

where the function f is a combination function for performing maximum ratio combination or equal gain combination algorithms for the MST (Most Significant Tap).

15. The channel estimation device according to claim 13 further includes a delaying means for delaying the channel estimation of the OFDM symbol at a previous time an OFDM symbol period to obtain said previous OFDM symbol.

16. The channel estimation device according to claim 13, wherein further includes a weighting means for weighting the channel estimation of the previous OFDM symbol and then performing IDFT, to obtain a channel impulse response CIRpreviousOFDMsymbol of the previous OFDM symbol on said time domain and to input said channel estimation device.

17. The channel estimation device according to claim 16, wherein if the weighting factor is set within (0, 1], the previous useful CIR information is fed back, and if the weighting factor is set to 0, the weighted information is reset in an interval of time, so as to keep the system stable.

18. The channel estimation device according to claim 13, wherein after adding zeros to the CIRthisOFDMsymbol, DFT operation is performed to obtain the channel estimation of the whole OFDM symbols and it is sent to an equalizer to obtain a user symbol.

* * * * *